United States Patent [19]

Hoppmann et al.

[11] Patent Number: 5,236,077
[45] Date of Patent: Aug. 17, 1993

[54] LINEAR FEEDER

[75] Inventors: Kurt H. Hoppmann, Falls Church; Charles Vaughn, Stafford; Philip S. Anderson, Sumerduck; Werner H. Schmitt, Falls Church, all of Va.

[73] Assignee: Hoppmann Corporation, Chantilly, Va.

[21] Appl. No.: 956,662

[22] Filed: Oct. 2, 1992

[51] Int. Cl.⁵ .............................................. B65G 47/24
[52] U.S. Cl. ................................... 198/380; 198/395; 198/397; 198/400
[58] Field of Search ............... 198/380, 384, 395, 397, 198/400; 221/171

[56] References Cited

U.S. PATENT DOCUMENTS

| | | |
|---|---|---|
| 2,771,191 | 11/1956 | Kath . |
| 2,970,683 | 2/1961 | Crosby et al. . |
| 3,031,059 | 4/1962 | Ingham ............................ 198/380 |
| 3,066,784 | 12/1962 | Remington et al. . |
| 3,101,832 | 8/1963 | Wyle et al. . |
| 3,331,486 | 7/1967 | Towry . |
| 3,367,477 | 2/1968 | Leth ................................. 198/395 |
| 3,392,815 | 7/1968 | Skeels, Sr. et al. . |
| 3,658,167 | 4/1972 | Zabroski et al. ................. 198/400 |
| 3,707,217 | 12/1972 | Sharbon . |
| 3,722,659 | 3/1973 | Aidlin et al. . |
| 3,738,473 | 6/1973 | Herrng . |
| 3,797,640 | 3/1974 | Aidlin et al. . |
| 3,833,111 | 9/1974 | Sterling et al. ................... 198/380 |
| 3,912,120 | 10/1975 | Hoppmann et al. . |
| 3,954,171 | 5/1976 | Chick et al. . |
| 3,982,637 | 9/1976 | Roetgerink . |
| 4,094,412 | 6/1978 | Hoppmann et al. . |
| 4,201,285 | 5/1980 | Chamberlain . |
| 4,208,761 | 6/1980 | Ionescu . |
| 4,362,234 | 12/1982 | McDonald et al. . |
| 4,440,286 | 4/1984 | Saxon . |
| 4,480,740 | 11/1984 | Wuermli . |
| 4,821,920 | 4/1989 | Lin et al. . |

FOREIGN PATENT DOCUMENTS 0243633 11/1987 European Pat. Off. .
2650812 2/1991 France .............................. 198/395

Primary Examiner—Joseph E. Valenza
Attorney, Agent, or Firm—St. Onge Steward Johnston & Reens

[57] ABSTRACT

An apparatus and method is provided for producing an oriented single file of articles comprising a conveyor having pockets for receiving articles, a lateral support surface forming a drop zone between it and an edge of the conveyor, a device for determining the direction in which articles are lying within the pockets, and a device for moving articles lying in one direction out of the pocket and onto the support surface.

19 Claims, 8 Drawing Sheets

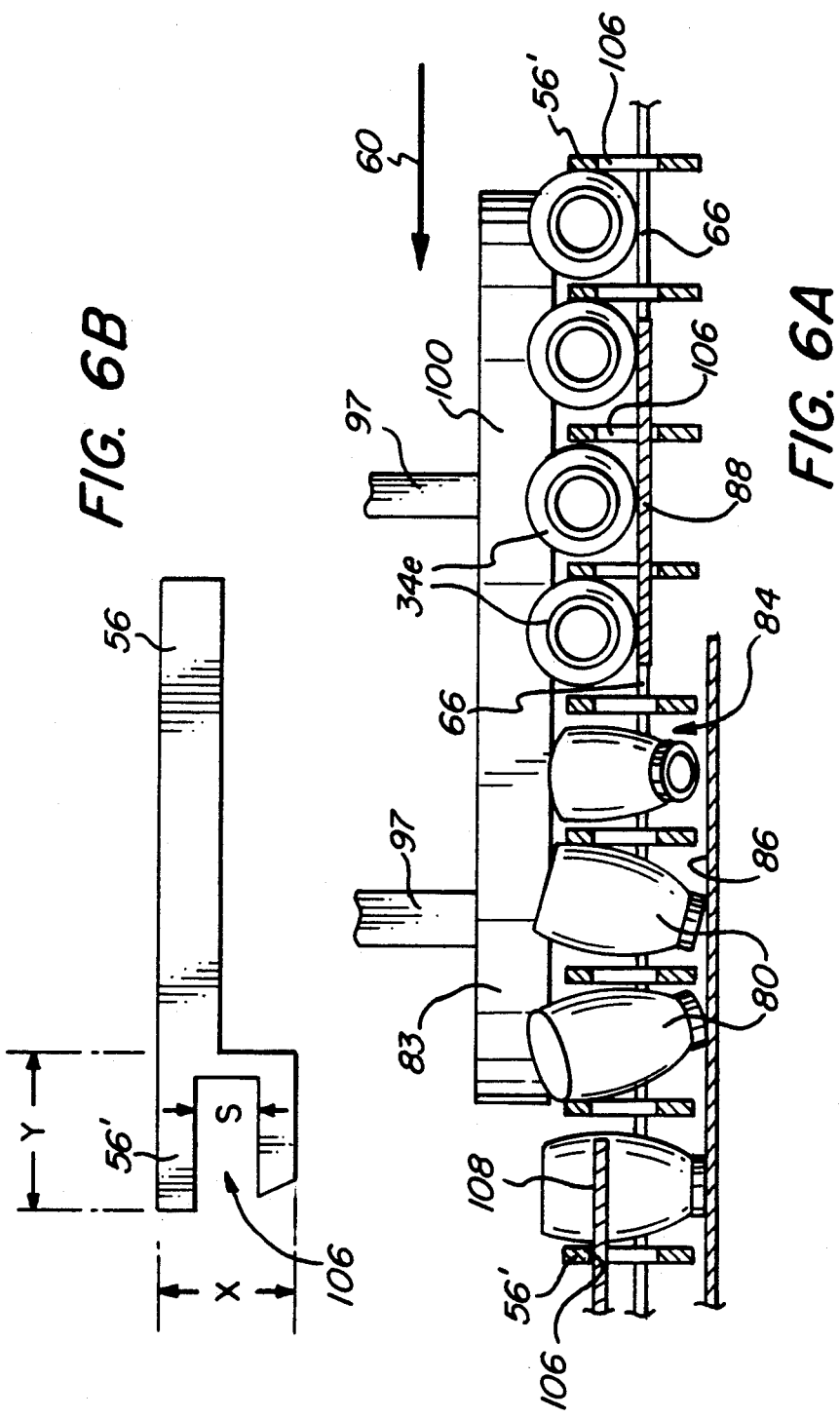

LINEAR FEEDER

FIELD OF THE INVENTION

The invention relates to a system for producing a single file of oriented articles from a jumbled bulk supply. More specifically, the invention relates to a linear apparatus and method for feeding a single file of oriented bottles from a bulk hopper to downstream stations.

BACKGROUND ART

Devices for unscrambling a bulk supply of jumbled articles into one or more oriented single file lines are well known in the art and include many designs and features. One type of prior art system is represented by the rotary or radial feeders disclosed in U.S. Pat. Nos. 3,707,217 (Sharbon), 3,101,832 (Wyle), 4,821,920 (Lin et al.) and 3,912,120 (Hoppmann), and in European publication No. 243,633 (Hoppmann). A disadvantage of centrifugal sorting methods is that the limited amount of time and radial distance makes orienting some articles, e.g., those only slightly asymmetrical, difficult if not impossible.

Other prior art systems such as U.S. Pat. Nos. 4,480,740 (Wurmli) and 3,982,637 (Roetgerink) disclose devices for orienting conical articles such as bobbins. In Wurmli, one of a pair of wheels engages the wider end of each bobbin to move the narrower end toward tipping pins. In Roetgerink, supporting members are designed such that narrower ends of the bobbins fall therebetween before wider ends of the bobbins. Proper functioning of these devices appears to depend upon the specific geometry, e.g. conical, of the articles being oriented.

U.S. Pat. No. 2,771,191 (Kath) discloses a device which supports capsules on a spaced apart pair of fulcrum blades. One or the other blade is moved transversely away from the capsule, depending upon which end is sensed as the cap end, and the capsule is permitted to fall. This device disadvantageously requires a fairly large number of interrelated moving parts.

U.S. Pat. Nos. 4,362,234 (McDonald), 2,970,683 (Crosby) and 3,722,659 (Aidlin) disclose devices which disadvantageously generate two rows of oriented articles from a single infeed row of articles. Central wedges, divider plates or the like are used to tip articles to either side thereof depending upon their alignment in the single file.

U.S. Pat. No. 3,392,815 (Skeels) discloses a swivel hook which enters open ends of bottles to transfer them to the far side of a funnel but can not enter bottle bottoms which fall into the near side of the funnel.

U.S Pat. Nos. 3,331,486 (Towry) and 3,797,640 (Aidlin) disclose devices which inefficiently reject and recycle "misaligned" articles rather than orienting them.

SUMMARY OF THE INVENTION

Accordingly, it is an object of the invention to provide a linear feeder for producing a single row of oriented articles which is relatively simple in construction and dependable in use.

Another object of the invention is to provide a linear feeder usable with a variety of different article types and shapes.

Still another object of the invention is to provide a linear feeder which qualifies articles by the size and/or shape of an end of the article.

Yet another object of the invention is to provide a linear feeder having a deadplate and a drop zone therebetween.

Yet still another object of the invention is to provide a linear feeder of the above character including a conveyor having pockets for bringing articles to the drop zone.

A further object of the invention is to provide a linear feeder including vanes for conveying articles along the drop zone.

A still further object of the invention is to provide a linear feeder of the above character wherein the vanes include slits for introducing an article guide.

A yet still further object of the invention is to provide a linear feeder of the above character including means for moving articles from the conveyor pockets to the deadplate.

Other objects of the invention will be obvious and may in part appear hereinafter.

These and other objects are achieved by provision of an apparatus for producing an oriented single file of articles comprising a conveyor having pockets for receiving articles, a lateral support surface forming a drop zone between it and an edge of the conveyor, a device for determining the direction in which articles are lying within the pockets, and a device for moving articles lying in one direction out of the pocket and onto the support surface.

Preferably, the conveyor includes spaced-apart vanes forming/separating the pockets. The lateral support surface is preferably a deadplate including an article stopping wall. The direction determining device is preferably a wiper which only one end of the articles can fit beneath and a sensor/switch for sensing an article extending beneath the wiper and for switching the article moving device ON and OFF as necessary. The article moving device is preferably a fluid jet, and the sensor/switch is preferably an optical-type sensor. Finally, a guide is used to cam articles aligned with an end which does not fit beneath the wiper toward an edge of the conveyor.

In another aspect, the invention relates to a method for orienting a single file of articles comprising the steps of determining the direction in which articles are lying within pockets on a conveyor, moving articles lying in a first direction to a laterally spaced support surface, shifting articles lying in a second direction toward an edge of the conveyor, and arranging the articles into the same orientation by causing them to fall into a drop zone between the surface and the edge.

The invention and its particular features will become more apparent from the following detailed description considered with reference to the accompanying drawings.

BRIEF DESCRIPTION OF THE DRAWINGS

FIG. 6A is a cross-sectional side view of the vaned conveyor and orientation station of the linear feeder of FIG. 1.

FIG. 6B is a front elevation view of a vane of the vaned conveyor of the linear feeder of FIG. 1.

DETAILED DESCRIPTION OF THE INVENTION

Figure 1:
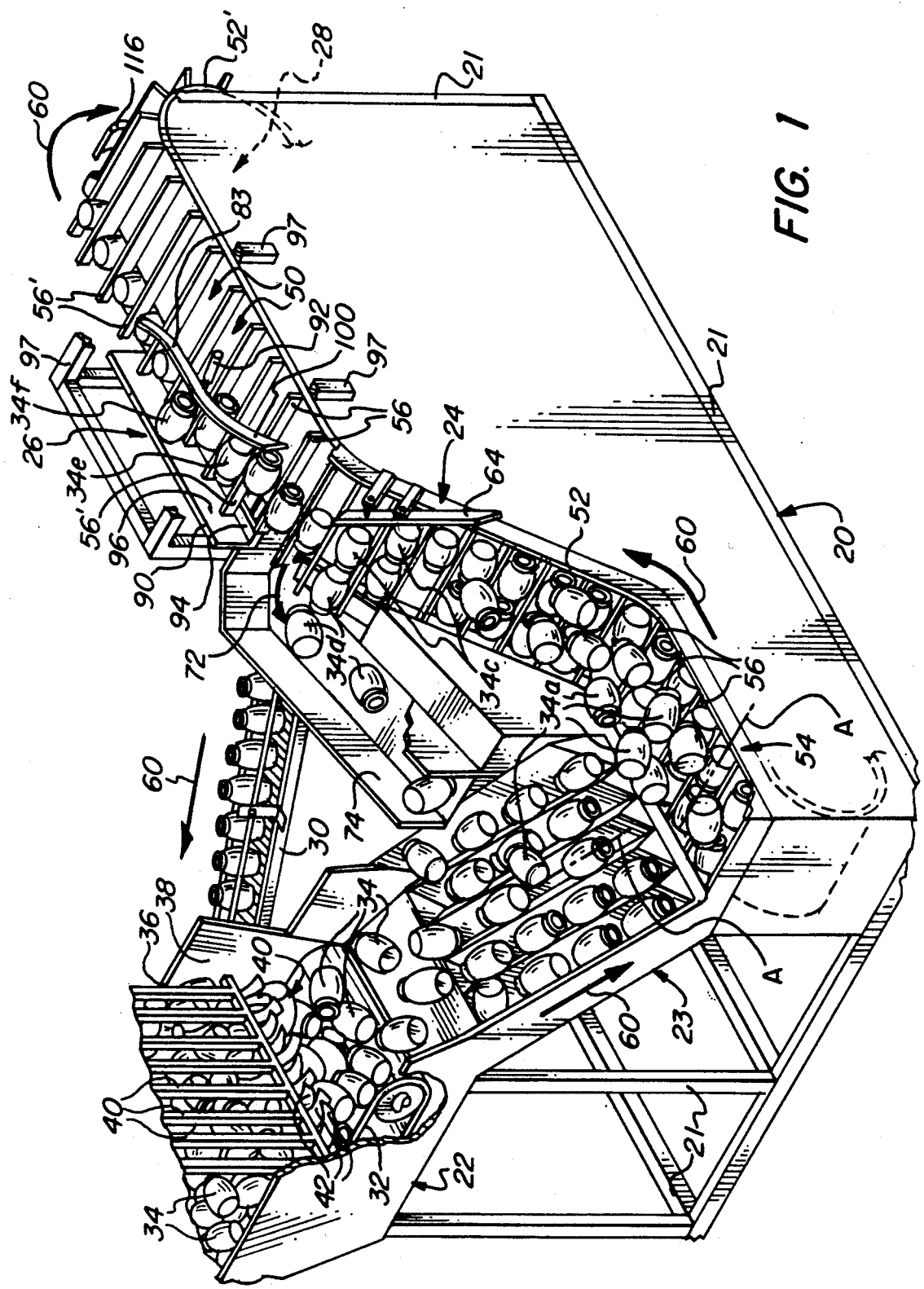
FIG. 1 is a front isometric view of a linear feeder in accordance with the invention.
Figure 2:
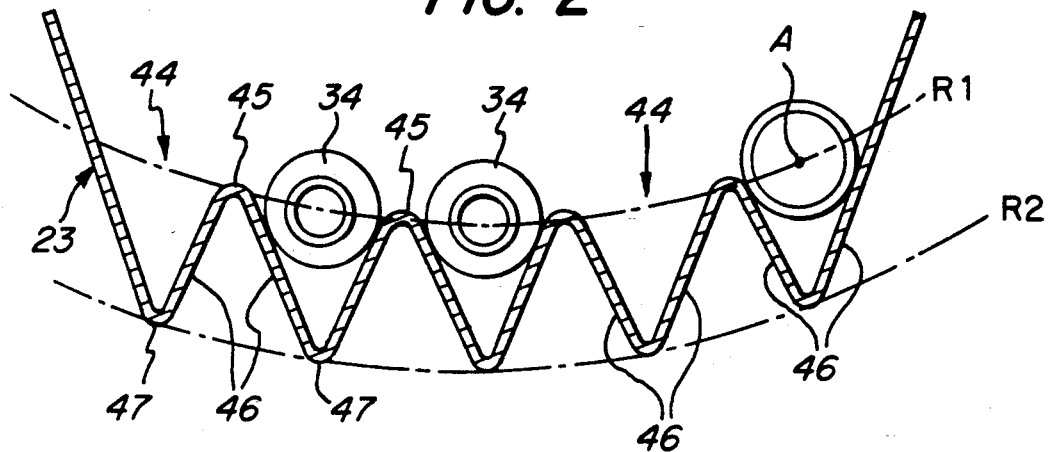
FIG. 2 is a cross-sectional end view of the preorientation chute of the linear feeder of FIG. 1.

FIG. 1 is a front isometric view of a linear feeder 20 in accordance with the invention. FIGS. 2-10 and 6A are enlarged partial views which illustrate specific components and operation of feeder 20.

Linear feeder 20 is generally comprised of a prefeeder 22, a preorientation chute 23, a singulation station 24, an orientation station 26, a cleaning station 28 (see FIG. 9) and an output conveyor 30 mounted together on a frame 21.

Prefeeder 22 includes a prefeed conveyor 32 for metering articles 34 such as plastic bottles from a supply hopper 36, mounted adjacent the prefeed conveyor, to preorientation chute 23. Supply hopper 36 includes downwardly and inwardly sloping side walls 38, a plurality of rigid grates 40 and a plurality of flexible grates 42 mounted across lower opening 44 of hopper 36 adjacent the top surface of prefeed conveyor 32. Sloping side walls 38 and flexible grates 42 are designed to meter articles 34 in a smooth, steady fashion from hopper 36 to conveyor 32 and into downwardly sloping preorientation chute 23 which is preferably, but need not be aligned substantially parallel to the prefeed conveyor and which has a "washboard configuration" as illustrated in the cross-sectional view of FIG. 2. By "washboard configuration" is meant that chute 23 is divided into a plurality of longitudinal lanes 44 having sloping walls 46. Walls 46 meet in a plurality of peaks 45 and valleys 47 which preferably follow concentric arcs R1 and R2 designed to urge articles toward the center of chute 23. Peaks 45 are preferably radiused curved to prevent them from damaging tumbling articles. As articles 34 tumble into chute 23, the provision of longitudinal lanes 44 tends to naturally rotated articles 34 with their axes A (see FIG. 3 also) arranged substantially longitudinally, i.e., substantially in the downstream direction 60, with respect to chute 23. The provision of sloping walls 46 in downwardly sloping chute 23 further tends to arrange articles 34 lying on their sides within lanes 44.

Returning to FIG. 1, articles 34 tending to lie on their sides within longitudinal lanes 44 slide from downwardly sloping chute 23 and into pockets 50 on a conveyor 52 at a loading zone 54. In the region of loading One 54, conveyor 52 is preferably substantially horizontal to facilitate pocket loading. Conveyor 52 is aligned substantially perpendicular to chute 23 and downstream direction 60 changes accordingly so that articles leaving lanes 44 can slide directly into the pockets which are transversely arranged on conveyor 52. Preferably, conveyor 52 is a vaned conveyor provided with a plurality of spaced-apart vanes, blades, paddles or the like which form and separate pockets 50. Pockets 50 of conveyor 52 are preferably sized to hold two or more articles 34 lying end to end on their sides.

It is understood that not all articles 34 are properly preoriented in lanes 44 of chute 23 and similarly that not all articles are properly loaded into every pocket 50 on conveyor 52. Thus, chute 23 and loading zone 54 will very likely include a few articles 34a which tumble down chute 23 or conveyor 52. In this regard, loading zone 54 includes side walls (not shown) which prevent articles 34a from cascading off conveyor 52 and permit them to attempt to fill empty pocket spaces. Loading zone 54 preferably also includes a sensor (not shown) for slowing or stopping prefeed conveyor 32 most preferably by a controller (also not shown) to slow or stop delivery of articles 34 to loading zone 54. It has been determined that maximum loading efficiency is attained when the speed of prefeed conveyor 32 is adjusted to supply a relatively steady stream of articles 34 to loading zone 54 which prevents an excessive buildup of articles 34a necessitating frequent starting and stopping of the prefeed conveyor.

Figure 3:
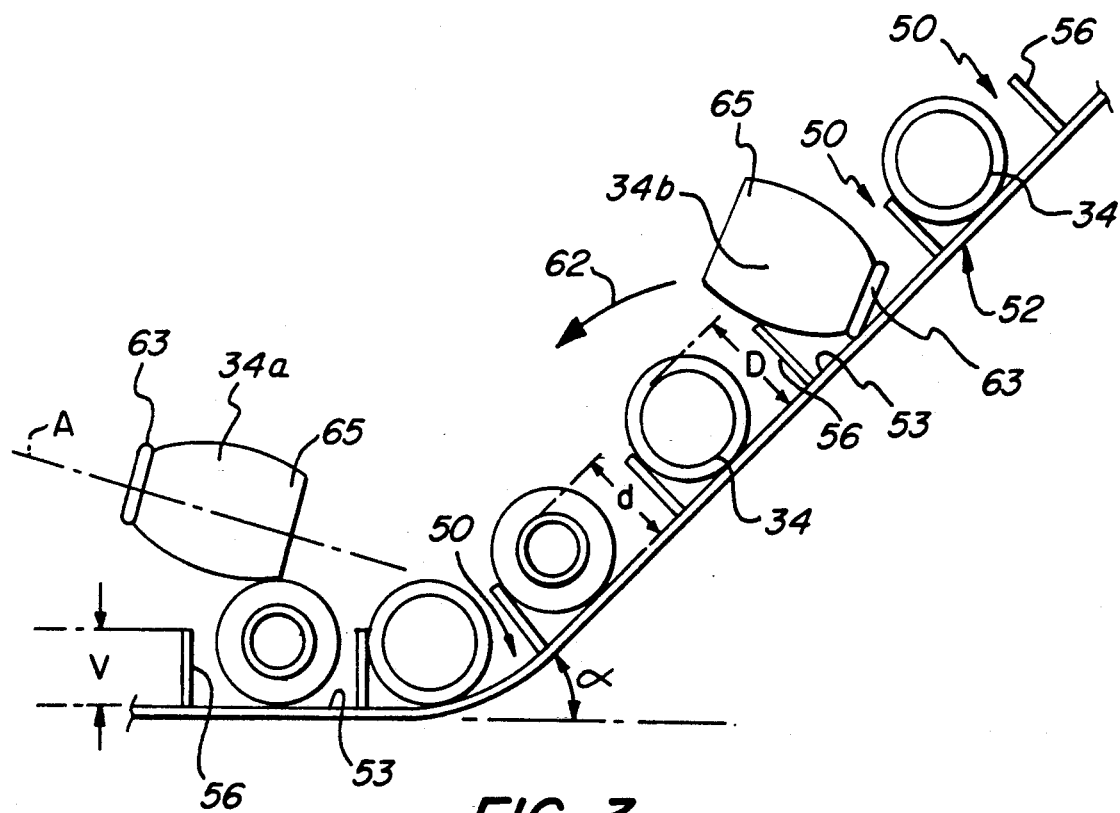
FIG. 3 is a cross-sectional partial side elevation view of the vaned conveyor of the linear feeder of FIG. 1.

Downstream of, i.e., in the direction of arrows 60 from loading zone 54, vaned conveyor 52 slopes upwardly toward singulation station 24. Referring to FIG. 3, the angle alpha of inclination of conveyor 52 is preferably selected together with the height v to which vanes 56 extend above surface 53 of vaned conveyor 52 such that articles 34b loaded in pockets 50 in a standing as opposed to a lying position will tend to fall out of pockets 50 by force of gravity as indicated by arrow 62. In applications where higher vanes are preferred, where vaned conveyor 52 is level and does not slope, or where supplemental forces are required to remove standing articles from pockets, it is understood that air jets, wipers or other means may be provided to tip the articles out of the pockets, and that sensors may also be provided to identify such standing articles.

Figure 4:
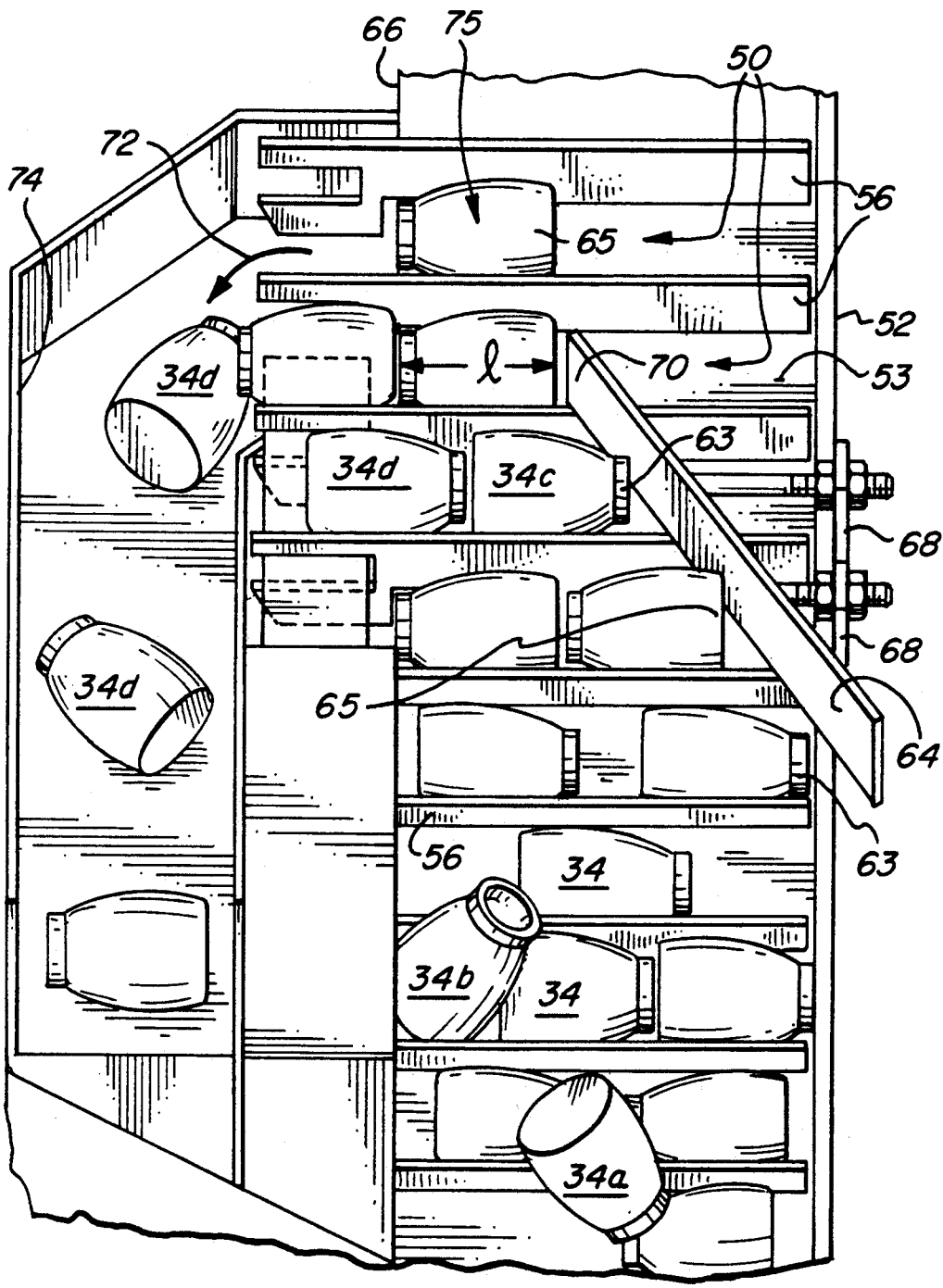
FIG. 4 is a front elevation view of the vaned conveyor and singulation station of the linear feeder of FIG. 1.

Height v of vanes 56 is less than a distance d between conveyor surface 53 and the highest point on the lowest end 63 of articles 34 as they lie on their sides within pockets 50. Referring to FIG. 4, this is necessary so that wiper or guide rail 64 mounted above conveyor 52 and above vanes 56 can shift or cam articles 34 regardless of whether lower ends 63 or higher ends 65 are abutting the guide.

Guide 64 shifts articles transversely across conveyor surface 53 along pockets 50 toward edge 66 of conveyor 52 as vanes 56 carry the articles downstream.

Guide 64 also functions to remove all but one article 34 from every pocket which is loaded with more than one article. As discussed above, pockets 50 are preferably sized to accommodate two or more articles 34 aligned end to end across pocket conveyor 52. This is done to improve the chances that each pocket 50 will include at least one article in order to maintain relatively constant machine throughput. It is understood that pockets occasionally may not be loaded with any articles and that unacceptable numbers of empty pockets may be remedied by increasing the speed of prefeed conveyor 32.

Guide 64 is mounted to conveyor frame 21 with brackets 68. Downstream end 70 of guide 64 is mounted a distance equal to about one article length 1 away from edge 66 of conveyor 52. As guide 64 shifts articles 34c in contact therewith toward conveyor edge 66, these articles shift other articles 34d in the pocket off conveyor 52. As indicated by arrow 72, articles 34d shifted off conveyor 52 fall by gravity into a recirculation or recycling chute 74. Articles 34c remain on conveyor 52 and form a single file 75 of articles lying along conveyor edge 66. Returning to FIG. 1, recycling chute 74 returns articles to preorientation chute 23, loading zone 54 and/or bulk storage hopper 36. It is understood that the number of articles returned by chute 74 will affect the speed at which prefeed conveyor 32 meters articles into the loading zone for maximum loading efficiency.

Figure 5:
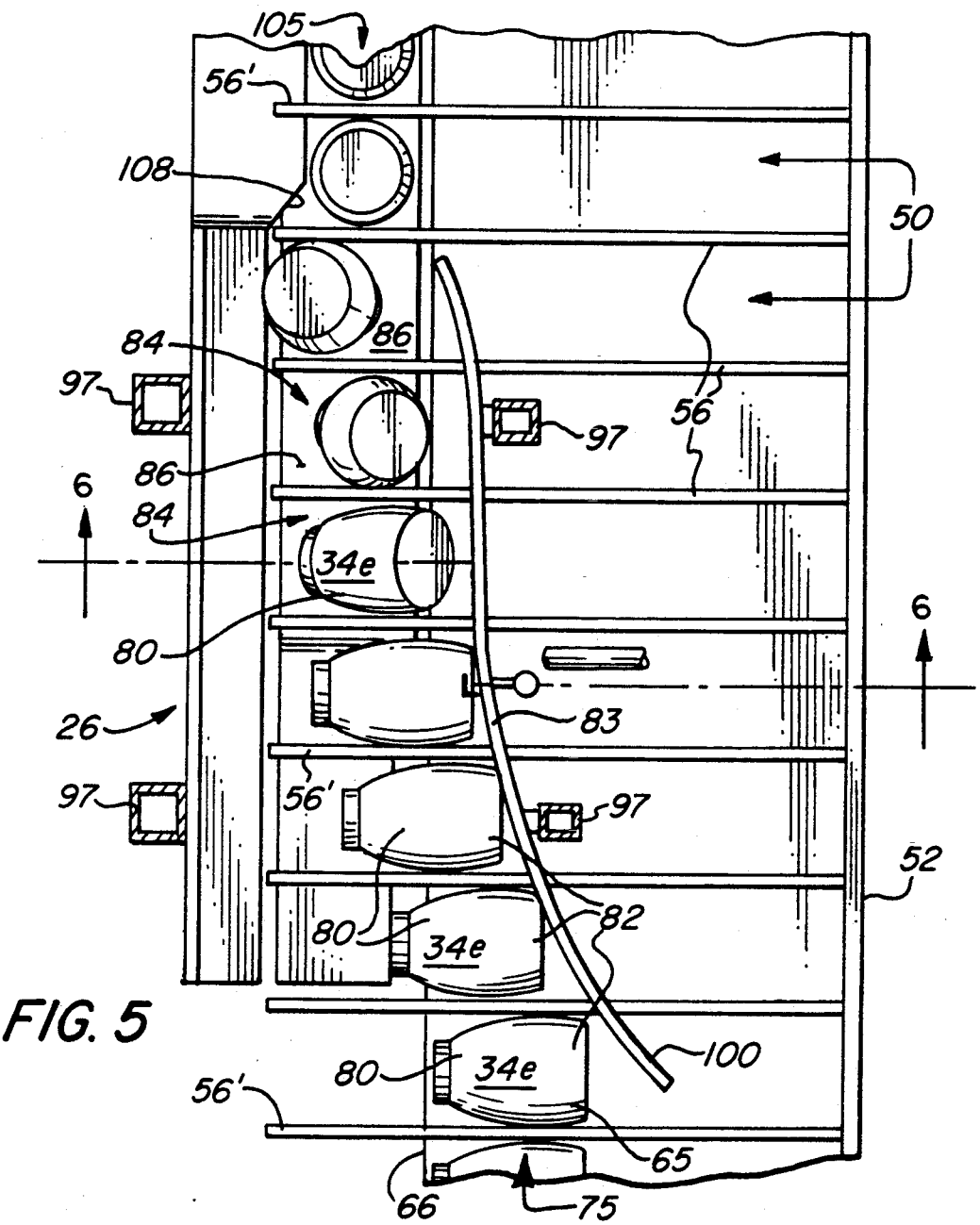
FIGS. 5 and 7 are top plan views of the vaned conveyor and orientation station of the linear feeder of FIG. 1.
Figure 6:
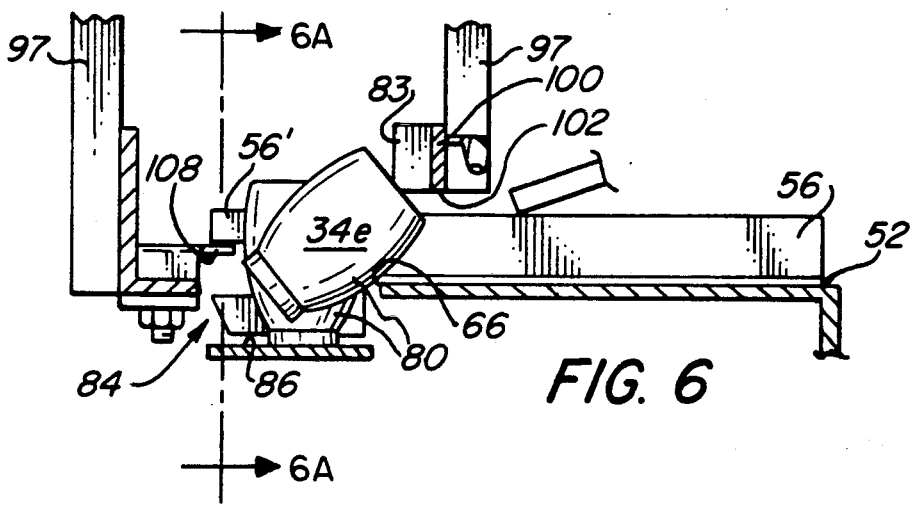
FIGS. 6 and 8 are cross-sectional end views of the vaned conveyor and orientation station of the linear feeder of FIG. 1.
Figure 7:
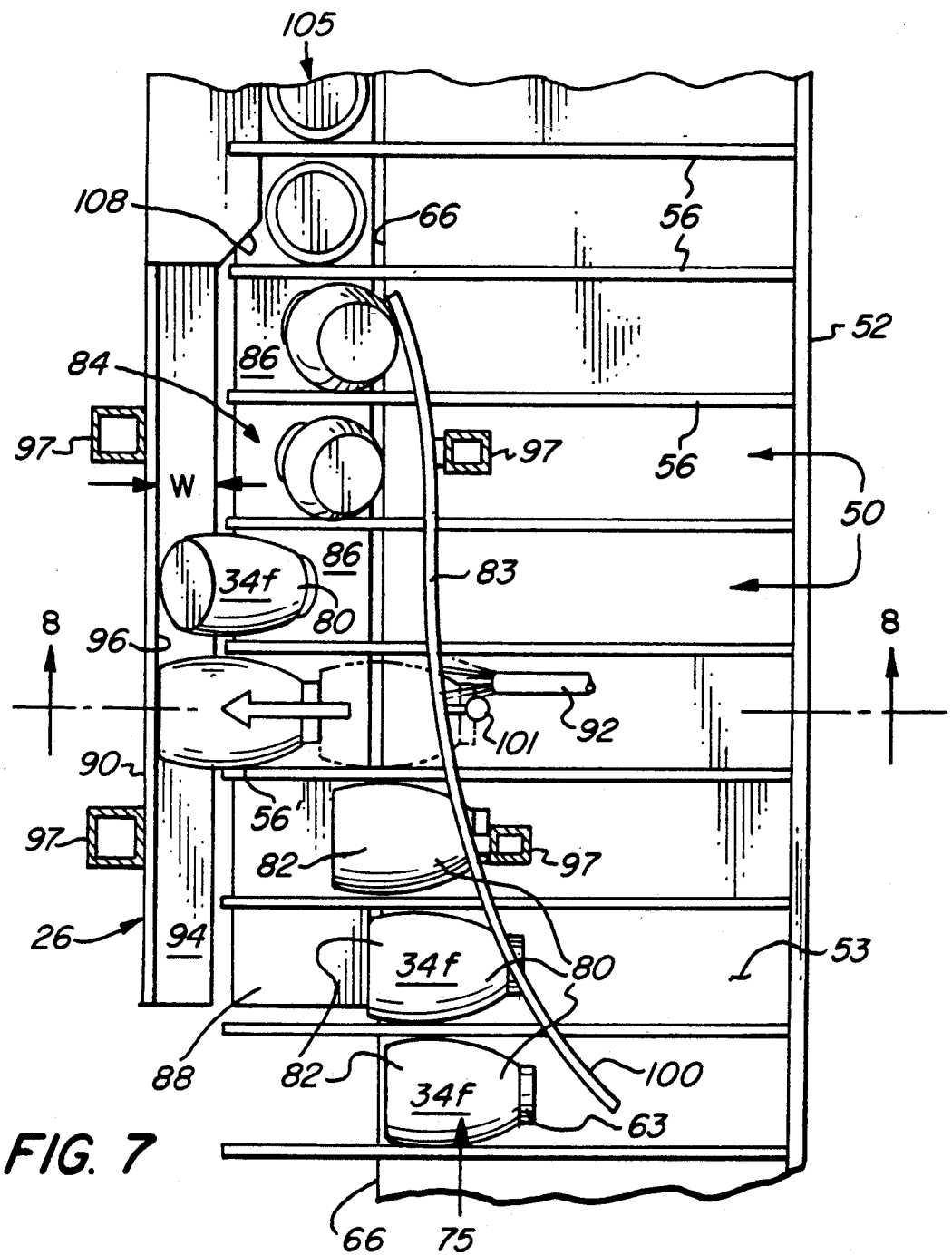
Figure 8:
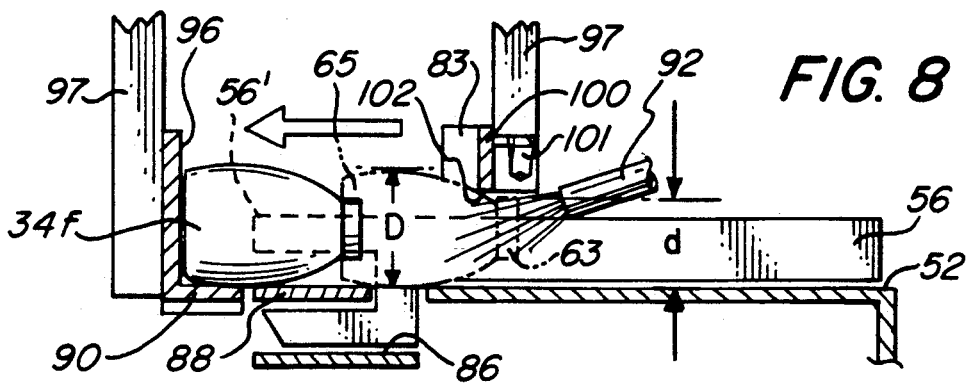
Figure 9:
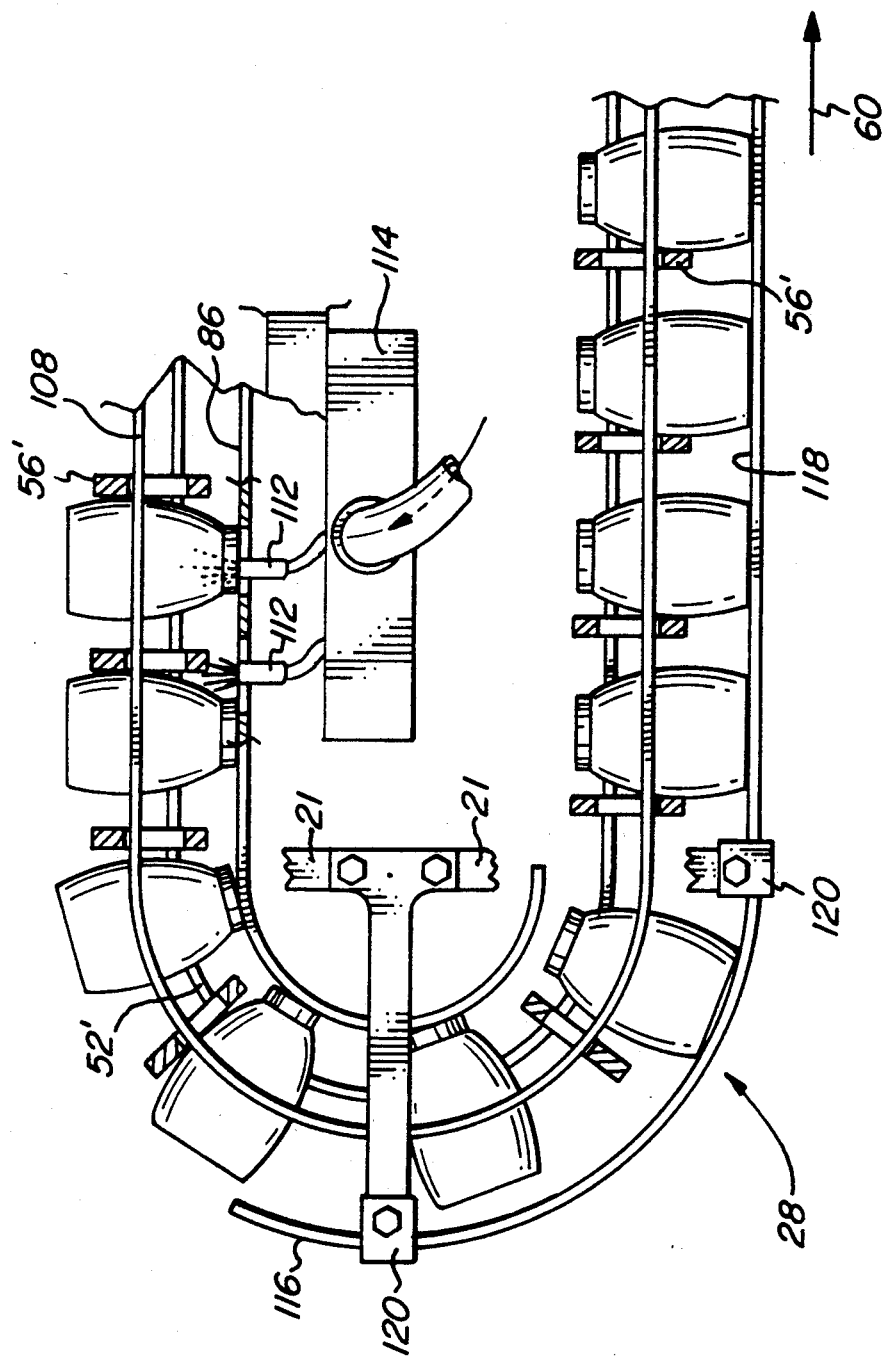
FIG. 9 is a partial rear elevation view of the vaned conveyor and product cleaning station of the linear feeder of FIG. 1.
Figure 10:
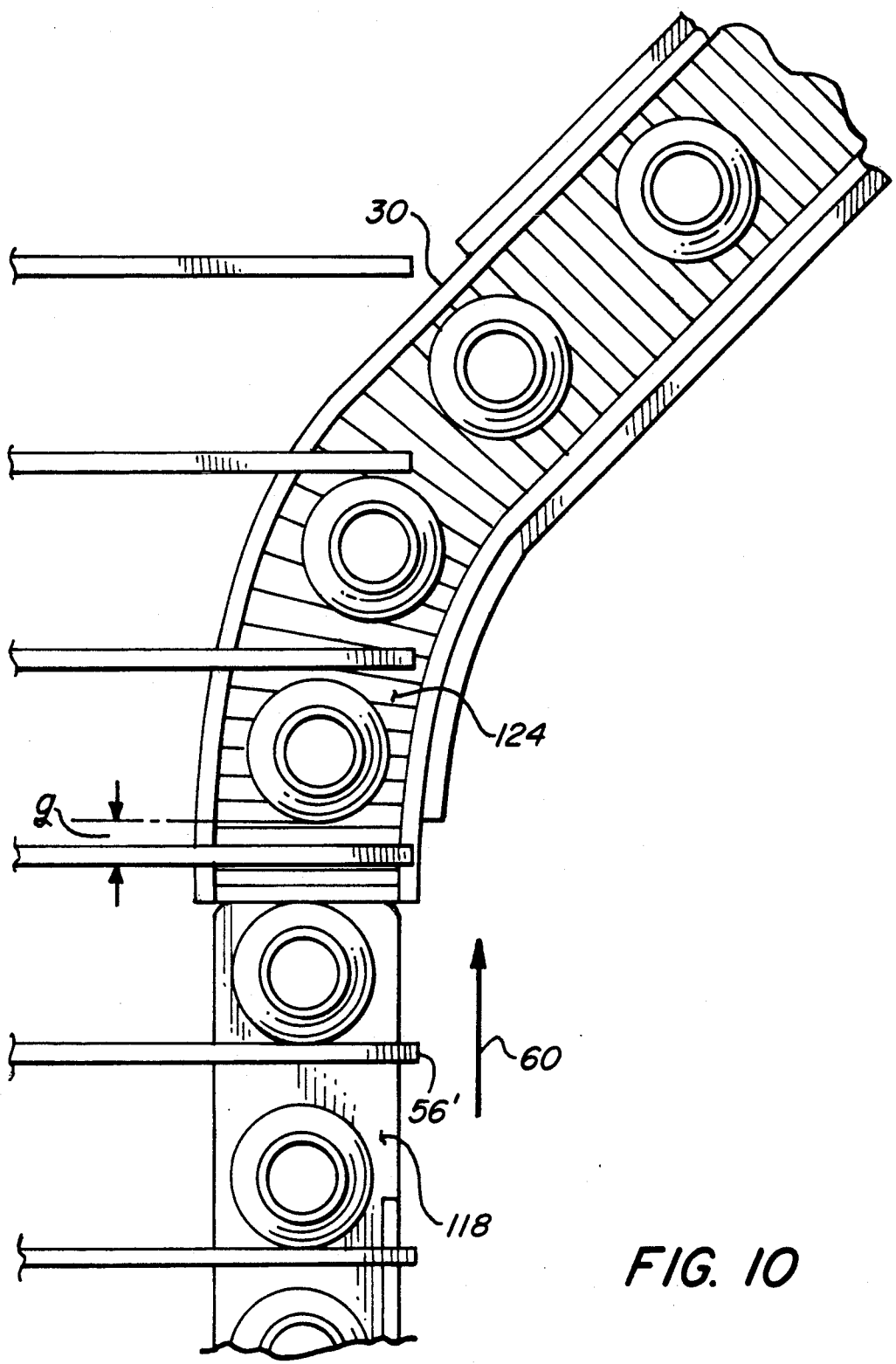
FIG. 10 is a top plan view of the output conveyor of the linear feeder of FIG. 1.

Referring now to FIGS. 5-8, single file 75 of articles is conveyed further downstream to orientation station 26. FIGS. 5 and 6 depict operation of station 26 to orient articles 34e in input single file 75 having their heavier ends 80 initially nearest conveyor edge 66. FIGS. 7 and 8 depict operation of station 26 to orient articles 34f in input single file 75 having their lighter ends 82 initially nearest conveyor edge 66. It is understood that, in operation, single file 75 will include articles aligned in both directions, i.e., some with their lighter and some with their heavier ends initially nearer conveyor edge 66.

Referring first to FIGS. 5 and 6, articles 34e having their heavier ends 80 initially nearer conveyor edge 66 are cammed or shifted by wiper or guide 83 over conveyor edge 66 such that heavier ends 80 will fall by gravity into a drop zone 84 and onto support surface 86. Surface 86 may comprise a conveyor surface but is preferably a stationary surface over which articles are moved by vane portions 56' which transversely extend beyond conveyor edge 66.

Referring now to FIGS. 7 and 8, articles 34f having their lighter ends 82 initially nearer conveyor edge 66 are transversely moved off conveyor 52 across a deadplate 88 and onto a shelf or deadplate portion 90 by a fluid jet 92 or other means such as a mechanical wiper. Conveyor surface 53, deadplate 88 and shelf are substantially all in planar alignment for smooth article transfer. Vane portions 56' move articles 34f along deadplate 88 and deadplate portion 90. In this regard, vane portions 56' include slits 106 for receiving and passing over deadplate 88. It is understood that conveyors may be used instead of these deadplates, with or without vane portions 56'. All that is essential is transferring articles 34f to a support surface on the opposite side of drop zone 84 from conveyor edge 66.

Shelf 90 is laterally spaced from conveyor edge 66 and includes an article supporting surface 94 and an article stopping wall 96 which may include means for temporarily retaining transferred articles to prevent them from bouncing. Alternatively, the line pressure in fluid jet 92 or the angle or force of a mechanical wiper can be adjusted substantially to prevent articles from bouncing back.

The width w of supporting surface 94 of shelf 90 is sufficiently small such that heavier ends 80 of the articles will fall by gravity into drop zone 84 and onto support surface 86.

In operation to orient a random input of articles 34e, 34f, each with their heavier ends 80 facing down on support surface 86, it is necessary to selectively control operation of air jet 92 or other article moving means. Whether air jet 92 needs to be ON to move an article to shelf 90 or OFF to allow an article to pass downstream to conveyor edge 66 depends upon the direction in which the article is aligned within pocket 50, i.e., whether the lighter or heavier end of the article is initially nearer conveyor edge 66. Determining the direction in which articles are lying within the pockets is called "qualification" and must be completed for each article arriving in single file 75 at orientation station 26.

Qualification is accomplished by wiper or guide rail 100 and sensor/switch 101 which analyze the size or shape of the article end initially further from conveyor edge 66. It is understood that the article end initially nearer conveyor edge 66 could also be qualified. Sensor/switch 101 may be provided as electro-optical or mechanical, however, electro-optical is preferred and fiber optic is most preferred due to their reliability and remote source. A controller (not shown) may be connected between sensor 101 and air jet 92 for switching the air jet ON or OFF according to logic which may be wired or programmed into the controller.

Once it has been determined in which direction smaller end 63 of the article is aligned, the direction in which the heavier end 80 of the article is aligned is known since the correlation between article end size and article end weight is given from inspecting articles 34. A lower edge 102 of wiper 100 is mounted above conveyor surface 53 a very specific height which is greater than distance d (between conveyor surface 53 and the highest point on the lowest end 63 of articles) and less than distance D (between conveyor surface 53 and the highest point on the highest end 65 of articles)(see FIGS. 3 and 8). This ensures that lower ends 63 of articles can always fit beneath wiper 100 and that higher ends 65 of articles in single file 75 can not ever fit beneath wiper 100.

Referring again to FIGS. 5-8, ends 63 of articles aligned as 34f will pass under wiper 100 and be sensed by sensor 101 which momentarily turns air jet 92 on to move the article to shelf 90. Ends 65 of articles aligned as 34e will not extend under wiper 100 and thus not trip sensor 101 or turn air jet 92 ON and thus these articles are passed downstream. It is understood that different articles may have a different correlation of size and weight at their ends and thus may have a different switching scheme. For example, it may be necessary or desirable to turn air jet 92 momentarily OFF instead of momentarily ON.

Singulation and orientation of articles is accomplished according to a method including the steps of introducing articles into pockets on conveyor 52, eliminating all but a single article from each pocket 50, determining whether articles are lying in a first direction (34f) or a second direction (34e), moving articles 34f to support surface 94, shifting articles 34e toward conveyor edge 66, and advancing the articles downstream with vane portions 56' whereby they fall by gravity into drop zone 84.

In order to facilitate changeover to different articles, at least guide 83, guide 100, sensor 101 and air jet 102 of orientation station 26 are adjustably mounted to a tooling frame 97 suspended above conveyor 52.

Oriented single file 105 of articles 34 is carried further downstream by vane portions 56' which slide heavier ends 80 of the articles over drop zone surface 86. Referring to FIGS. 6 and 6A, vane portions 56' include slits 106 for receiving a straightening guide 108 mounted downstream of wiper 83, downstream deadplate portion 94, and across drop zone 84 from conveyor edge 66. Straightening guide 108 effectively narrows drop zone 84 and uprights articles 34 in oriented single file 105. It is understood that drop zone 84 must be slightly wider in one region to permit articles to tip thereinto than in another region in which the articles are retained in an upright position.

Referring to FIGS. 6A and 8, vane portions 56' transversely extend a distance Y from conveyor edge 66 which is sufficient to convey articles moved to shelf 90. Similarly, vane portions 56' extend down into drop zone 84 a distance X sufficient to convey articles over drop zone surface 86. It is understood that magnitudes of X and Y and their ratio may be varied as necessary to accommodate various articles. Further, the width s of slit 116 may be varied or additional slits may be provided to accommodate a variety of guides, deadplates or the like as is necessary or desired.

In the example illustrated by the Figures, articles 34 are bottles in which heavier ends 80 are also the tops or open ends. Thus, the open ends of bottles 34 are oriented downward in single file 105. This oriented, uprighted, single file is moved further downstream by vane portions 56' to cleaning station 28 illustrated in FIG. 9.

Cleaning station lies along a recirculating portion 52', and at the rear side (see FIG. 1), of conveyor 52. Recirculating conveyor portion 52' returns to loading zone 54. At cleaning station 28 support surface 86 includes a plurality ionizing air jets 112 converted to a pressurized fluid source 114. Air jets 112 include a spark gap inside each nozzle and fill the bottles with ionized air to attract dust particles therein. The dust particles fall out of the bottles by gravity.

Next, a curving guide plate 116 retains the bottles between vane portions 56' as they are turned over bottoms down on an inner surface 118 of plate 116. Surface 118 becomes the support over which the bottles are slid to output conveyor 30. Guide plate 116 is mounted to conveyor frame 21 by brackets 120. It is understood that not all articles and indeed not all bottles will need necessarily to be turned over.

Single file 105 of oriented, uprighted and cleaned bottles is moved further downstream by vane portions 56' onto surface 124 of output conveyor 30 which diverges with the path of vane portions 56' and moves at a slightly greater linear speed than conveyor 52 to pull a gap g between the bottles and vane portions 56' for easing the bottles out from between vanes 56. Slits 106 in vane portions 56' may also be used to receive a wiper or guide for camming bottles out from between the vanes, however, this can cause tipping of articles, especially where the upper portion of the articles is heavier than the lower portion as the articles stand uprighted on the output conveyor.

Linear feeder 20 is designed to utilize vertical dimensions and a circuitous type processing path in order to provide a relatively simple machine having the smallest possible footprint.

Although the invention has been described with reference to particular embodiments, features, materials of construction and the like, these are not intended to exhaust all possible features, and indeed many other modifications and variations will be ascertainable to those of skill in the art without departing from the scope of the invention as defined in the appended claims.

What is claimed is:

1. An apparatus for producing an oriented single file of articles comprising:
    a conveyor having a plurality of spaced-apart vanes forming pockets therebetween for receiving articles, portions of said vanes transversely extending beyond an edge of said conveyor;
    a lateral support surface disposed beneath said transversely extending vane portions and spaced apart from said conveyor edge to provide a drop zone therebetween;
    switch means actuable by articles aligned in said pockets in a first direction; and
    means, responsive to said switch means, for moving articles aligned in said first direction toward said transversely extending vane portions and onto said lateral support surface.

2. The single filing apparatus of claim 1 wherein said switch comprises a guide rail disposed above said conveyor a distance sufficient to permit a first, smaller end of articles in said pockets to fit beneath said guide rail.

3. The single filing apparatus of claim 2 wherein said switch further comprises a sensor for determining whether said first end of the articles is extending beneath said guide rail.

4. The single filing apparatus of claim 2 wherein said guide rail is disposed above said conveyor a distance low enough such that a second, larger end of articles in said pockets is abutted by said guide rail to shift the articles toward the edge of said conveyor.

5. The single filing apparatus of claim 1 wherein said article moving means comprises an air jet.

6. The single filing apparatus of claim 1 including a second guide rail, disposed over said conveyor upstream of said article moving means, for creating a single file of articles in said pockets.

7. An apparatus for producing an oriented single file of articles from a supply of articles comprising:
    a conveyor having a plurality of pockets for receiving articles, said conveyor having an edge;
    a support surface disposed adjacent to and spaced apart from said conveyor to define an orientation drop zone;
    a sensor for determining whether an article is aligned in said pockets in a first direction; and
    a fluid jet, selectably actuable in response to said sensor, for moving articles onto said support surface and for passing articles further along said conveyor depending upon the direction in which the article is aligned;
    whereby articles fall by gravity into said drop zone with the same orientation.

8. The single filing apparatus of claim 7 including a wiper disposed above said conveyor upstream of said fluid jet for shifting articles toward said conveyor edge.

9. The single filing apparatus of claim 8 wherein said wiper is disposed above said conveyor a distance sufficient to permit an article aligned in the first direction to extend beneath said wiper.

10. The single filing apparatus of claim 8 wherein said sensor and fluid jet are mounted adjacent said wiper.

11. An apparatus for producing an oriented single file from a bulk supply of articles comprising:
    an article hopper;
    a conveyor having a plurality of spaced-apart vanes forming pockets therebetween for receiving articles from said hopper, said conveyor having an edge, portions of said vanes transversely extending beyond said edge;
    a first guide disposed over said conveyor for creating a single file of articles in said pockets;
    an orientation deadplate disposed adjacent said conveyor, said orientation deadplate including a portion spaced apart from said edge of said conveyor to form a drop zone;

means for determining the direction in which an article is aligned in said pocket;

means, selectably controllable by said direction determining means, for moving articles aligned in a first direction in said pockets onto said orientation dead plate portion; and a second guide disposed over said conveyor for shifting articles aligned in a second direction in said pockets toward said conveyor edge;

whereby articles fall by gravity from said orientation deadplate portion and from said conveyor edge into said drop zone with the same orientation regardless of their alignment in said pocket.

12. The single filing apparatus of claim 11 comprising a third guide for straightening articles in said drop zone, and wherein said transversely extending vane portions include slits for receiving said third guide.

13. The single filing apparatus of claim 11 wherein said first guide shifts articles toward said edge to recycle all but a single article in said pockets.

14. The single filing apparatus of claim 11 wherein said second guide shifts articles at least partially onto said orientation deadplate.

15. The single filing apparatus of claim 11 wherein said direction determining means comprises a sensor mounted adjacent said second guide.

16. The single filing apparatus of claim 11 wherein said article moving means moves articles across said orientation deadplate to said orientation deadplate portion.

17. The single filing apparatus of claim 11 wherein said article moving means comprises an air jet mounted adjacent said second guide.

18. A method of producing an oriented single file of articles from a bulk supply comprising the steps of:

introducing articles from the bulk supply into pockets of a conveyor;

determining whether articles lying within the pockets are aligned in a first direction;

moving the article to a support surface adjacent an edge of the conveyor if the article is lying in the first direction;

shifting the article toward the edge of the conveyor if it is not lying in the first direction; and arranging articles into the same orientation by advancing articles downstream along the support surface and the conveyor edge causing them to fall by gravity into a drop zone between the surface and the edge.

19. The method of claim 18 including, before the determining step, the step of eliminating all but one article from pockets of the conveyor to provide a single file of articles lying on their sides.

* * * * *